United States Patent Office 3,577,472
Patented May 4, 1971

3,577,472
METHOD FOR CHLORINATING PARAFFINS
John C. Jubin, Jr., Wallingford, and Matthew L. Becker, Philadelphia, Pa., assignors to Atlantic Richfield Company, Philadelphia, Pa.
No Drawing. Filed May 28, 1968, Ser. No. 732,507
Int. Cl. C07c 17/10
U.S. Cl. 260—660
7 Claims

ABSTRACT OF THE DISCLOSURE

Paraffins are chlorinated to avoid production of dark colored impurities and to maintain maximum selectivity for the production of monochloroparaffins by admixing the chlorine with a portion of the cold paraffin charge and thereafter combining this cold chlorine-containing stream with the remainder of the charge paraffin which has been heated to a temperature above the desired reaction initiation temperature.

BACKGROUND OF THE INVENTION

Field of the invention

This invention relates to a method for chlorinating paraffin hydrocarbons in the $C_9$ to $C_{18}$ range to avoid production of dark colored impurities during the chlorination reaction by dividing the charge paraffin into two streams, disolving chlorine in the cold stream and combining this stream with the second stream which has been heated to a temperature above reaction initiation temperature.

Prior art

In one method of producing alkyl aryl sulfonate detergents, paraffin hydrocarbons in the $C_9$ to $C_{18}$ range are chlorinated and the resulting alkyl chlorides are reacted with benzene in the presence of an aluminum-chloride catalyst to give alkylbenzenes which thereafter are sulfonated.

Since monochloroparaffins react sequentially with chlorine to give poylchloroparaffins and since it is desirable to use monochloroparaffins for alkylating the benzene, heretofore it has been found necessary in order to maximize monochloride production to operate the chlorination reaction under conditions such that only from 10 to 35 percent of the paraffins are converted to the paraffin chlorides. When operating at these conversions it has been found that the monochloroparaffins generally are in the range of between 80 weight percent and 95 weight percent of the total chloroparaffins produced.

In accordance with conventional commercial practice, chlorine is added to the hot paraffin stream. Even under the most carefully controlled methods, however, local high chlorine concentrations frequently occur with the result that there is produced black or very dark solid particles. Along with the production of the black impurities another result of the local overchlorination is a lower yield of monochloroparaffins. These black solid impurities have been described in the literature and it has been found that they tend to act as aluminum chloride alkylation poisons. When these black impurities are formed and are allowed to enter the alkylation reaction along with the chlorinated paraffin product the hydrogen chloride gas production almost ceases. This indicates that the alkylation reaction also is seriously impaired. Thus it is very important to avoid the production of these black particles or impurities in the chlorination step.

In accordance with the usual commercial method for the production of alkylated benzenes for detergents from chloroparaffins the entire chlorinated paraffin stream including the unreacted paraffin is used to alkylate the benzene in the presence of an aluminum chloride catalyst.

Following the alkylation reaction and neutralization of the crude alkylate the benzene is separated and recycled to the alkylation step and the unreacted paraffins are separated and recycled to the chlorination reaction. Thus the black solid particles tend to build up in the chlorination reactor and it has been found that they will catalyze the formation of chlorobenzene and chlorinated alkylbenzenes from the small amounts of benzene and low molecular weight alkylbenzenes which usually are incompletely separated from the paraffins which are being recycled to the chlorination step.

The chloroaromatics thus formed tend to produce undesirable polynuclear contaminants in the alkylate product as well as give a product with an undesirably high organic chlorine content rendering the alkylate unsuitable for production of commercial quality detergents.

As has been pointed out, it is commercial practice to add the chlorine to the hot paraffin. This has been done by means of gas sparger tubes, spray nozzles or by eductors. None of these methods have been found to be satisfactory, however, since frequent overchlorination occurs and the black impurities are produced. These methods also are particularly sensitive to velocities and to the configuration of the chlorine injection distributing means. Furthermore, with these methods it is difficult to achieve high selectivities for the production of monochloroparaffins.

SUMMARY OF THE INVENTION

The afore-mentioned difficulties and disadvantages of the prior art processes are overcome substantially completely by the method of this invention. In accordance with this invention the chlorine which is to be utilized in the chlorination reaction is first dissolved in a cold paraffin stream. Since the reaction rate of chlorine with paraffins at low temperatures is exceedingly slow, no reaction occurs even where there is temporary overconcentrations of chlorine. The chlorine becomes uniformly dispersed in the cold paraffin and thereafter this chlorine-paraffin solution is combined with a hot stream of paraffin. Since the chlorine is already dispersed in paraffin when this solution is combined with the hot paraffin, no over-concentration of chlorine can occur and therefore no local over-chlorination.

After the two streams have been mixed the temperature of the resulting stream is above that required for the initiation of the chlorination recation and, accordingly, the reaction proceeds smoothly without the formation of the black impurities, and with a minimum of polychlorides formed. This method also has been found to be far less sensitive to velocities in the reactor and to particular configurations and in addition maximum selectivity for production of monochlorides is maintained continuously.

It is an object of this invention therefore to provide an improved method for chlorinating paraffin hydrocarbons.

It is another object of this invention to provide a method for chlorinating paraffin hydrocarbons which avoids local overconcentrations of chlorine in the reaction mixture.

It is another object of this invention to provide a method for the chlorination of paraffin hydrocarbons wherein the production of dark colored impurities is avoided.

It is another object of this invention to provide a method for the chlorination of paraffin hydrocarbons wherein the maximum monochloride production and minimum polychloride production is maintained.

DESCRIPTION OF THE PREFERRED EMBODIMENTS

The paraffins which are chlorinated in accordance with this invention preferably contain at least nine carbon atoms and can contain up to about eighteen carbon atoms or more. While individual single carbon number paraffins can be chlorinated by the instant method, generally it is applied to mixtures of paraffins having about a four or five carbon number spread, for example, a $C_{11}$ to $C_{15}$ fraction, since these fractions are preferred for detergent production.

The method is also applicable to both branched chain and straight chain paraffins, however, straight chain paraffins are preferred in order that the resulting detergent be biodegradable.

Conventional chlorination temperatures can be employed, for example, temperatures of from about 180° F. to 450° F., temperatures in the range of from 230° F. to 390° F., however, are preferred. Likewise, the reaction may be carried out in the liquid phase under sufficient pressure or in mixed phase if lower pressures are employed. Conventional reactors can be used such as the conventional pipeline type or the stirred tank type. The pipeline type of reactor has the advantage of being less costly and leads to higher selectivities to monochlorination.

In carrying out the method of this invention the paraffin feed is divided into two portions, one maintained at a temperature between about 70° F. and 130° F. and the other stream being heated to a temperature above the desired reaction temperature. This temperature is sufficiently above the desired reaction temperature so that when the cold chlorine-containing paraffin stream is admixed therewith the resulting mixture is at the desired reaction temperature.

It is obvious, of course, that the temperature to which the hot stream must be heated depends upon a number of factors, for example, the temperature of the cold stream, the relative proportions of the quantity of hot stream and quantity of cold stream, and the temperature at which it is desired to carry out the reaction. In general, temperatures of at least 180° F. to 200° F. are required to initiate thermal chlorination reactions, i.e. those carried out in the absence of a catalyst. An illustration of a typical blending of hot and cold streams will be set forth in the accompanying example.

For convenience, the paraffin charge is divided into two approximately equal streams although they can range from about a 1:3 ratio to a 3:1 ratio. All of the chlorine to be utilized in the reaction is admixed with the cold stream and it has been found that gaseous chlorine must be used to avoid the danger of detonation when liquid chlorine is used. Since the solubility of gaseous chlorine in paraffins increases with decreasing temperature, at temperatures of 70° F. to about 85° F. the chlorine dissolves so rapidly that mechanical difficulties such as "hammering" occur and, accordingly, these temperatures are less desirable, although they can be used if very finely divided bubbles of chlorine are introduced into paraffin. At temperatures of from about 85° F. to 130° F. the chlorine dissolves readily and smoothly. At all temperatures up to about 130° F. the rate of reaction of the chlorine with the paraffin is so slow that local high chlorine concentrations do not present any problems. These local high chlorine concentrations disappear upon thorough mixing.

The hot paraffin stream is preferably combined with the cold paraffin-chlorine stream by injecting the hot stream through a nozzle into the pipe carrying the cold paraffin stream. Preferably the nozzle is pointed in the direction of flow of the cold paraffin stream and arranged so that it is at the center of the pipe. With tank type reactors the hot paraffin stream can also be injected into the cold paraffin-chlorine mixture by means of suitable nozzles, or the like, well known to the art for such purposes.

The reaction temperature desired and the reaction pressure utilized are selected so that at least about 50 percent and preferably more than 70 percent of the chlorine remains dissolved in the liquid phase. This temperature and pressure can, of course, be calculated in accordance with conventional calculations but it will be understood that these amounts of chlorine which are in the liquid phase are selected for convenience and are not critical.

Although this invention has been described in terms of non-catalytic thermal chlorination reactions, it is equally applicable to chlorination reactions which are catalyzed, either photochemically or by means of conventional catalysts such as iodine.

The example which follows is provided for the purpose of illustrating additional specific embodiments of the invention and to demonstrate the utility of the invention. This example, however, should not be construed as limiting.

EXAMPLE

A run was carried out in a commercial detergent plant utilizing the method of this invention. The data given are typical for the entire run of the plant. The paraffin charge stream to the chlorinator was straight chain (99.8 percent purity) and in the $C_{10}$–$C_{13}$ range with only a very small amount of $C_{14}$ paraffin, the average was $C_{11}$. A pipeline reactor was employed and the cold paraffin flow was approximately 3170 gallons per hour at a temperature of approximately 85° F. The hot paraffin flow was approximately 3750 gallons per hour at a temperature of about 347° F. The chlorine flow to the cold paraffin stream was about 2176 pounds per hour. The calculated temperature of the mixture was about 246° F. The temperature measured approximately 20 feet downstream from the point of mixing was found to be 284° F. and the exit temperature from the chlorinator was 298° F. An inlet pressure of 28.44 p.s.i.g. was employed and the pressure at the outlet was 6.25 p.s.i.g. A conversion (i.e. weight percent paraffins converted to chlorides) of approximately 11 percent was obtained under these conditions and a molar selectivity, i.e. mole percent monochloroparaffins produced based on total moles of paraffin chlorides, was approximately 91 percent.

It was found after the plant had run in this manner for approximately four months that no black impurities had been formed and that the product was uniformly light colored and free of the dark colored impurities ordinarily associated with conventional chlorination processes.

As many possible embodiments can be made of this invention without departing from the broad scope thereof, it is to be understood that all matter herein set forth is to be interpreted as illustrative and not as unduly limiting the invention.

We claim:

1. A method for chlorinating paraffin hydrocarbons in the $C_9$–$C_{18}$ range which comprises admixing chlorine with a cold $C_9$–$C_{18}$ paraffin stream which is at a temperature in the range of from 70° F. to 130° F. to produce a cold paraffin-chlorine stream and thereafter admixing said cold paraffin-chlorine stream with a sufficient amount of the $C_9$–$C_{18}$ paraffin charge which has been heated to a temperature sufficiently high such that the resulting stream obtained from the admixing of the said cold paraffin-chlorine stream with the heated paraffin charge is above reaction initiation temperature.

2. The method according to claim 1 wherein said resulting stream has a temperature above about 180° F.

3. The method according to claim 1 wherein the cold paraffin stream is at a temperature in the range of from 85° F. to 130° F. and the resulting stream has a temperature above the range of about 180° F. to 200° F.

4. The method according to claim 1 wherein the cold paraffin stream is at a temperature in the range of from about 85° F. to 130° F. and the resulting stream is at a temperature in the range of from 180° F. to 450° F.

5. The method according to claim 1 wherein the cold paraffin stream is at a temperature in the range of from about 85° F. to 130° F. and the resulting stream is at a temperature in the range of from 230° F. to 390° F.

6. The method according to claim 1 wherein the paraffin hydrocarbons are straight chain and are in the range of from $C_{10}$ to $C_{14}$, the cold paraffin stream is at a temperature of about 85° F., the temperature of the hot paraffin stream is about 350° F. and the temperature of the resulting stream is about 250° F. after mixing, and after the chlorination reaction the temperature of the exit stream is about 300° F.

7. The method according to claim 6 wherein an inlet pressure in the reactor of about 28 p.s.i.g. is employed.

References Cited
UNITED STATES PATENTS 2,941,013  11/1958  Jenney et al. _____ 260—660

BERNARD HELFIN, Primary Examiner

J. A. BOSKA, Assistant Examiner